United States Patent
Chen (10) Patent No.: US 6,990,146 B2
(45) Date of Patent: Jan. 24, 2006

(54) METHOD AND SYSTEM FOR DETECTING INTRA-CODED PICTURES AND FOR EXTRACTING INTRA DCT PRECISION AND MACROBLOCK-LEVEL CODING PARAMETERS FROM UNCOMPRESSED DIGITAL VIDEO

(75) Inventor: Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 672 days.

(21) Appl. No.: 09/995,999

(22) Filed: Nov. 16, 2001

(65) Prior Publication Data

US 2003/0099290 A1    May 29, 2003

(51) Int. Cl.
    *H04N 7/18*        (2006.01)
(52) U.S. Cl. .......................... 375/240.13; 375/240.24; 375/240.25
(58) Field of Classification Search ............................. 375/240.11–240.26
    See application file for complete search history.

(56) References Cited

U.S. PATENT DOCUMENTS

| | | | | |
|---|---|---|---|---|
| 6,108,448 A | * | 8/2000 | Song et al. ................. | 382/235 |
| 6,327,390 B1 | * | 12/2001 | Sun et al. ................... | 382/235 |
| 6,549,245 B1 | * | 4/2003 | Lee et al. ................... | 348/700 |
| 6,697,523 B1 | * | 2/2004 | Divakaran et al. .......... | 382/173 |

* cited by examiner

*Primary Examiner*—Andy Rao (57) ABSTRACT

The present invention relates to a method and system for extracting coding parameters from uncoded video data. Encoded video data is decoded using an MPEG decoder to produce decompressed video data. A DC computation operation is performed to recover an intra-dc-precision level from the decompressed video data, such that if the intra-dc-precision level is less than a first predetermined threshold, the decompressed video data is classified as an intra-coded picture. If the intra-dc-precision level is equal to the first predetermined threshold, a discrete cosine transform (DCT) is performed to produce a set of DCT coefficients for at least one AC frequency band in the decompressed video data. Then, an average quantizer step size is computed based on the AC data and if the average quantizer step size is greater than a second predetermined threshold, the decompressed video data being processed is classified as an intra-coded picture. Thereafter, the quantization matrix data of a frame of the decompressed video data is extracted. In addition, a quantizer scale and a DCT type value for each block of the decompressed video data is extracted.

22 Claims, 10 Drawing Sheets

METHOD AND SYSTEM FOR DETECTING INTRA-CODED PICTURES AND FOR EXTRACTING INTRA DCT PRECISION AND MACROBLOCK-LEVEL CODING PARAMETERS FROM UNCOMPRESSED DIGITAL VIDEO

BACKGROUND OF THE INVENTION

1. Field of the Invention

The present invention relates to an image detecting system and method for extracting video signal parameters from uncompressed digital video data.

2. Description of the Related Art

In order to improve transmission efficiency, images containing a huge amount of data are typically compressed then transmitted over a transmission medium to a decoder, which is operative to decode the coded video data. A common coding method used is based on the discrete cosine transform (DCT). The DCT method has been adapted to international standard coding methods, such as JPEG (Joint Photographic Expert Group) and MPEG (Moving Picture Expert Group).

In digital video processing chains, uncompressed (or decoded) digital video data undergoes further down-stream processing, such as artifact reduction, quality enhancement, re-encoding, and editing. However, much care must be taken to identify and process the previously compressed digital video. For example, new displays such as LCOS and LCD have lower thresholds for artifact visibility; thus, the video enhancement algorithms must be tuned carefully to avoid enhancing artifacts. Accordingly, a reliable detector is needed to extract certain compression parameters from the decoded video data, such that the extracted quantization parameters can be adjusted to improve the displayed video quality by coding the local parts of video, or by re-encoding or transcoding of the previously compressed video data.

SUMMARY OF THE INVENTION

The present invention is directed to a method and system for extracting video signal parameters from uncompressed digital video data, without gaining access to compressed video bitstreams.

The present invention provides a method of extracting coding parameters from encoded video data. The method includes the steps of: decoding at least a substantial portion of the encoded video data in an MPEG decoder and outputting a decompressed video data; performing a DC computation operation to recover an intra-dc-precision level from the decompressed video data; and, if said intra-dc-precision level is less than a first predetermined threshold, determining that the decompressed video data being processed corresponds to an intra-coded picture. If the intra-dc-precision level is equal to or larger than the first predetermined threshold, a discrete cosine transform (DCT) is performed to produce a set of DCT coefficients for at least one AC frequency band in the decompressed video data. If the quantizer step size is greater than a second predetermined threshold, the decompressed video data being processed is classified as an intra-coded picture. Thereafter, the quantization matrix data of a frame of the decompressed video data is extracted. A quantizer scale and a DCT type value for each block of the decompressed video data is also extracted.

According to an aspect of the invention, a method of extracting coding parameters from an encoded digital video signal is provided. The method includes the steps of: receiving the encoded data of the encoded digital video signal at an MPEG decoder and producing therefrom decoded data comprised of a plurality of blocks; performing a DC computation operation to recover the intra-dc-precision level from the decoded video data; if the intra-dc-precision level is less than a first predefined threshold, classifying the decoded video data as an intra-coded picture; if said intra-dc-precision level is equal to said first predefined threshold, performing a discrete cosine transform (DCT) on the decoded video data to produce a set of DCT coefficients for at least one AC frequency band; calculating a quantizer step size for at least one AC frequency band; classifying the decoded video data as an intra-coded picture if the calculated quantizer step size is greater than a second predefined threshold; extracting the quantization matrix data of a frame of the decoded video data; and, extracting a quantizer scale and a DCT type value for each block of the decoded video data. Here, the quantization matrix, quantizer scale, and DCT type value correspond substantially to coding parameters used in a coding operation that was previously performed on the encoded video data.

According to an aspect of the invention, a system of extracting coding parameters from encoded video data is provided. The system includes a decoder for decoding at least a substantial portion of the encoded video data to produce decoded video data comprised of a plurality of blocks; a computation circuit for performing a DC computation operation to recover the intra-dc-precision level from the decoded video data; a decision circuit for determining whether the decoded video data being processed corresponds to an intra-coded picture; a discrete cosine transform (DCT) circuit for generating a set of DCT coefficients for at least one AC frequency band in the decoded video data; and, a quantization computation circuit for determining a quantizer step size for at least one AC frequency band. The system further includes a first extractor for extracting the quantization matrix data of a frame of the decoded video data, and a second extractor for extracting a quantizer scale and a DCT type value for each block of the decoded video data.

The foregoing and other features and advantages of the invention will be apparent from the following, more detailed description of preferred embodiments as illustrated in the accompanying drawings in which reference characters refer to the same parts throughout the various views. The drawings are not necessarily to scale; the emphasis instead is placed upon illustrating the principles of the invention.

BRIEF DESCRIPTION OF THE DRAWINGS

FIG. 3(*a*) depicts DCT coefficients for an AC frequency band of video data, which has not been subjected to a coding operation;

FIG. 3(*b*) depicts DCT coefficients for an AC frequency band of video data which have previously been subjected to a coding operation;

FIG. 3(*c*) depicts DCT coefficients for an AC frequency band of video data which have previously been subjected to a coding operation;

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
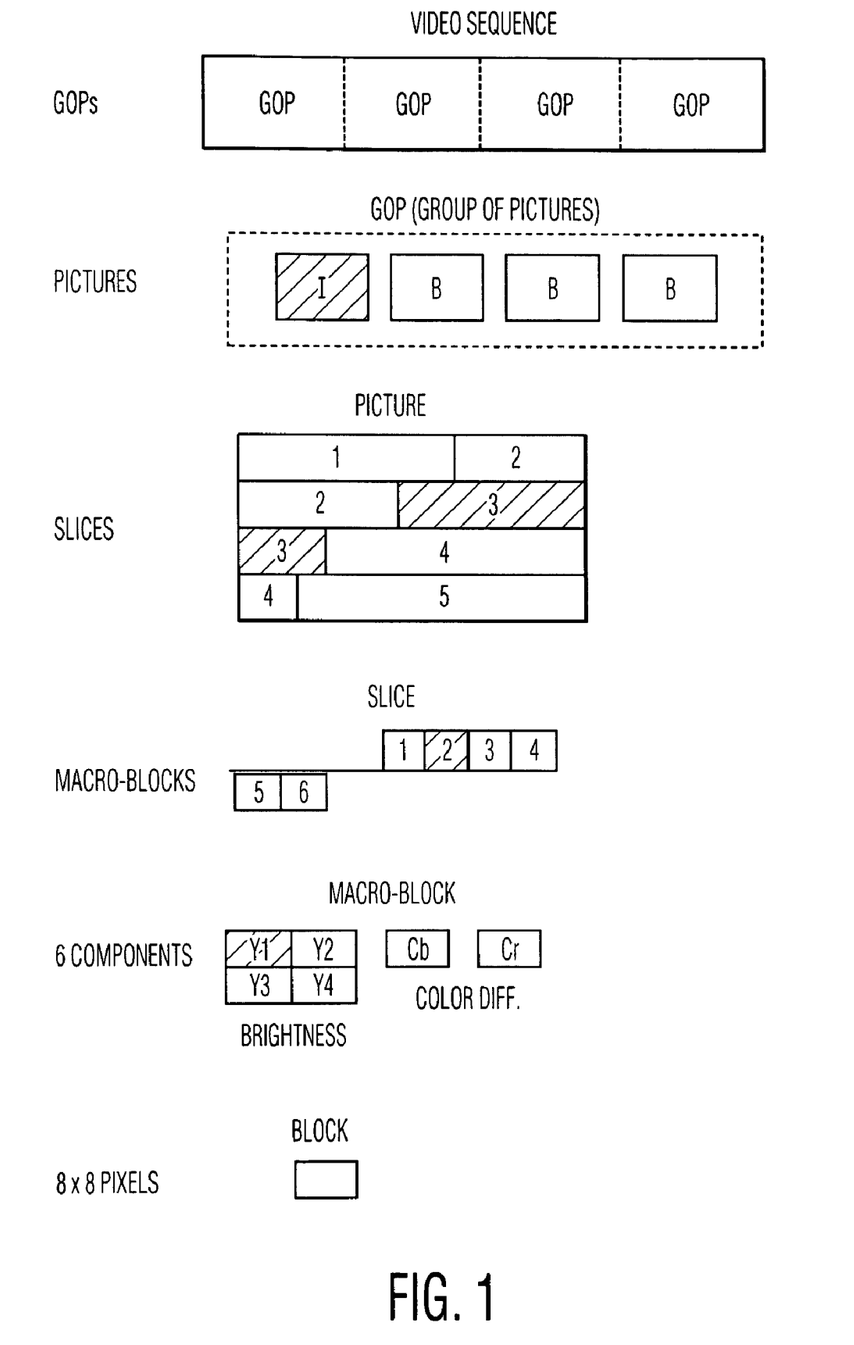
FIG. 1 is a diagram illustrating a hierarchical structure in a MPEG code.

In order to facilitate an understanding of this invention, background information relating to MPEG2 coding will be described in conjunction with FIG. 1. As shown in FIG. 1, a hierarchical structure of the code format in accordance with the MPEG standard is shown. The top layer of the structure comprises a video sequence consisting of a plurality of GOPs (groups of pictures), where a picture corresponds to a sheet of image. Each picture is divided into a plurality of slices, and each slice consists of a plurality of macro-blocks disposed in a line from left to right and from top to bottom. Each of the macro-blocks consists of six components: four brightness components Y1 through Y4 representative of the brightness of four 8×8 pixel blocks constituting the macro-block of 16×16 pixels, and two colors (U, V) constituting difference components Cb and Cr of 8×8 pixel blocks for the same macro-block. Lastly, a block of 8×8 pixels is a minimum unit in video coding.

The MPEG2 coding is performed on an image by dividing the image into macro-blocks of 16×16 pixels, each with a separate quantizer scale value associated therewith. The macro-blocks are further divided into individual blocks of 8×8 pixels. Each of 8×8 pixel blocks of the macro-blocks is subjected to a discrete cosine transform (DCT) to generate DCT coefficients for each of the 64 frequency bands therein. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are effected on the DCT coefficients to take into account, namely the quantizer scale value, among other things, and thereby completing MPEG2 coding. It should be noted that other coding techniques, such as JPEG or the like, may be used in the present invention.

Figure 2:
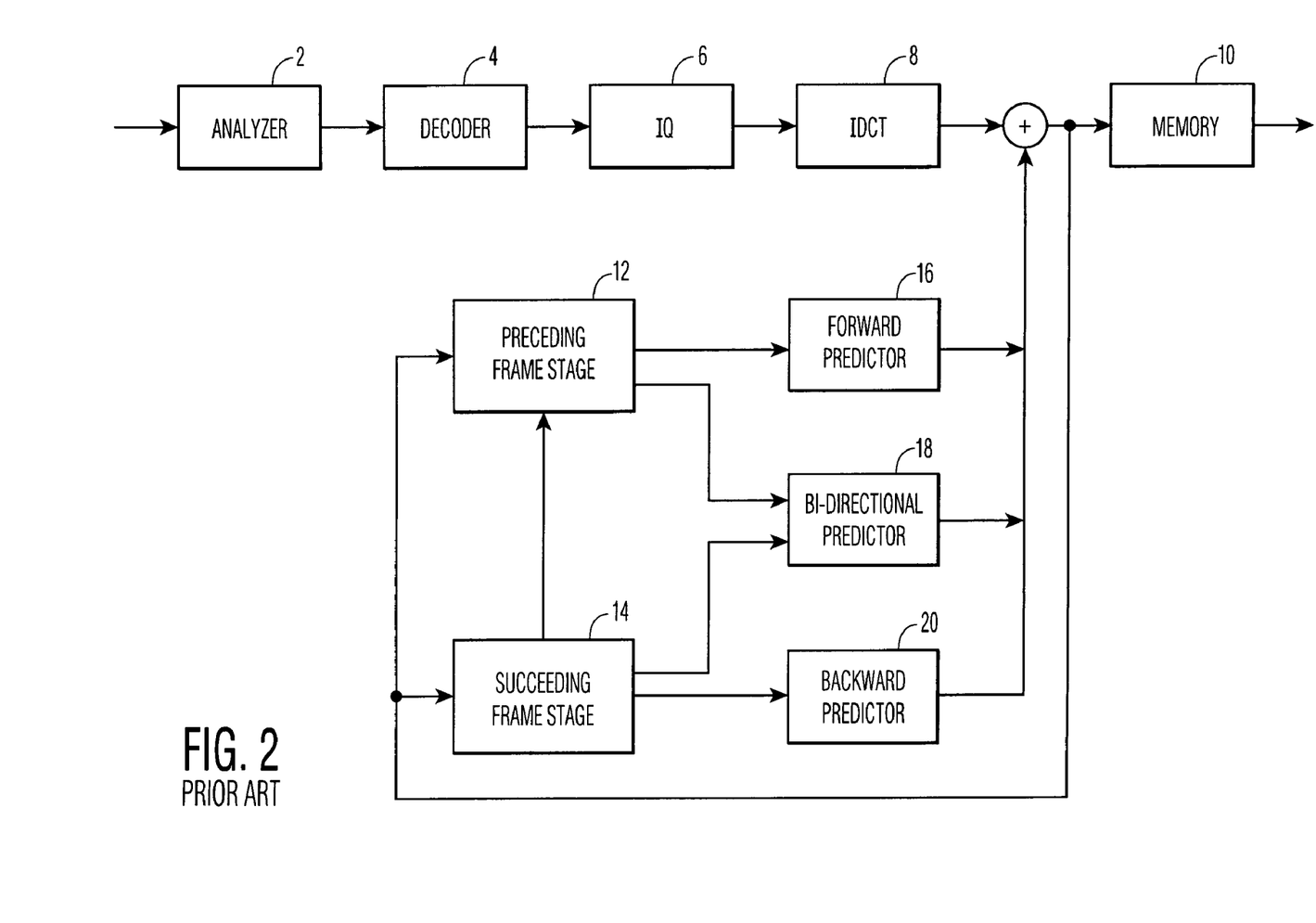
FIG. 2 is a block diagram of a moving picture reproducing an apparatus of the prior art.

A conventional DCT-based image recovering from a bitstream coded by the means of a DCT-based coding method (or an MPEG bitstream) will be described with reference to FIG. 2. FIG. 2 depicts how images are recovered from image codes based upon MPEG codes. Each of the codes or incoming bitstreams is analyzed to detect the type of the code using a header analyzer 2. In MPEG codes, the codes are divided into three types: (1) the intra-frame encoded codes defining an intra-coded picture as an I picture; (2) the inter-frame encoded codes that are predicted only from a preceding frame to constitute a predictive coded picture as a P picture; and, (3) the inter-frame encoded codes that are predicted from preceding and succeeding frames to constitute a bi-directionally predictive coded picture as a B picture.

If the detected codes are of an I picture, the detected codes are decoded using a decoder 4 then inverse-quantized using an inverse quantizer 6. Thereafter, the values of pixels in blocks into which the picture has been divided are calculated by an inverse DCT processing using an inverse DCT (IDCT) block 8, whereafter the calculated values are forwarded and stored in a video memory 10 to display the picture. If the detected codes are of a P picture, the detected codes are decoded and inverse-quantized, then the differences of the blocks are calculated. Each difference is added by a forward predictor 16 to a corresponding motion-compensated block of a preceding frame stored in a preceding frame stage 12, then the resultant expanded video data is written in a video memory 10 to display the image. If the detected codes are of a B picture, the detected codes are decoded and inverse-quantized. The differences of the blocks are calculated using the IDCT 8. At this time, each difference is added by a bi-directional predictor 18 or a backward predictor 20 to a corresponding motion-compensated block of a preceding frame stored in a preceding frame stage 12 and a motion-compensated block of a succeeding frame stored in a succeeding frame stage 14. The resultant expanded video data is then stored in the video memory 10 to display the image.

As described above, any video data following the international standard MPEG code can recover the image from MPEG codes. After the decoding process, the present invention provides a mechanism for detecting and extracting compression parameters from decoded video data. In the embodiment, by analyzing the statistical properties of an image, it is detected if the image has been previously intra-coded as opposed to P and B coded or non-coded. Thereafter, the intra DC precision, the quantization scales, and the DCT types (per macroblock) parameters that are used to code macroblocks can be extracted from intra-coded pictures, without gaining access to the compressed video bitstreams. A key principle of the present invention relies on the fact that the intra-coded pictures possess unique statistical properties that are different from the P and B coded pictures or the non-compressed pictures. For example, the DC coefficients of intra-coded pictures possess a certain modality depending on the MPEG parameter, namely, intra-DC-precision, which represents the number of bits used to represent intra DC coefficients during compression. The intra_dc_precision is a 2-bit integer defined to have the binary value 00, 01, 10 or 11 to designate a precision of 8, 9, 10, or 11 bits, respectively. This parameter indicates values that are used for inverse quantizing of DC coefficients of intra-coded blocks. The characteristics of the DC DCT coefficients can be used to detect the presence/absence of an intra-coded picture based on the statistical differences.

Similarly, the AC DCT coefficients of intra-coded pictures possess distinctive statistics from those of P and B coded or non-coded pictures as the AC DCT coefficients are represented (quantized) with limited information bits when compressed. The statistical difference of intra AC coefficients from those not coded pictures is described in U.S. Pat. No. 6,101,278, entitled "System for Extracting Coding Parameters from Video Data," assigned to the same assignee, thereby incorporated herein as a reference. Accordingly, the statistical difference between AC coefficients of intra coded pictures from those of P and B coded pictures may be used to detect the intra coded pictures from P and B coded pictures if extracted intra DC precision (as described above) does not give sufficient information on picture type.

Figure 3A:
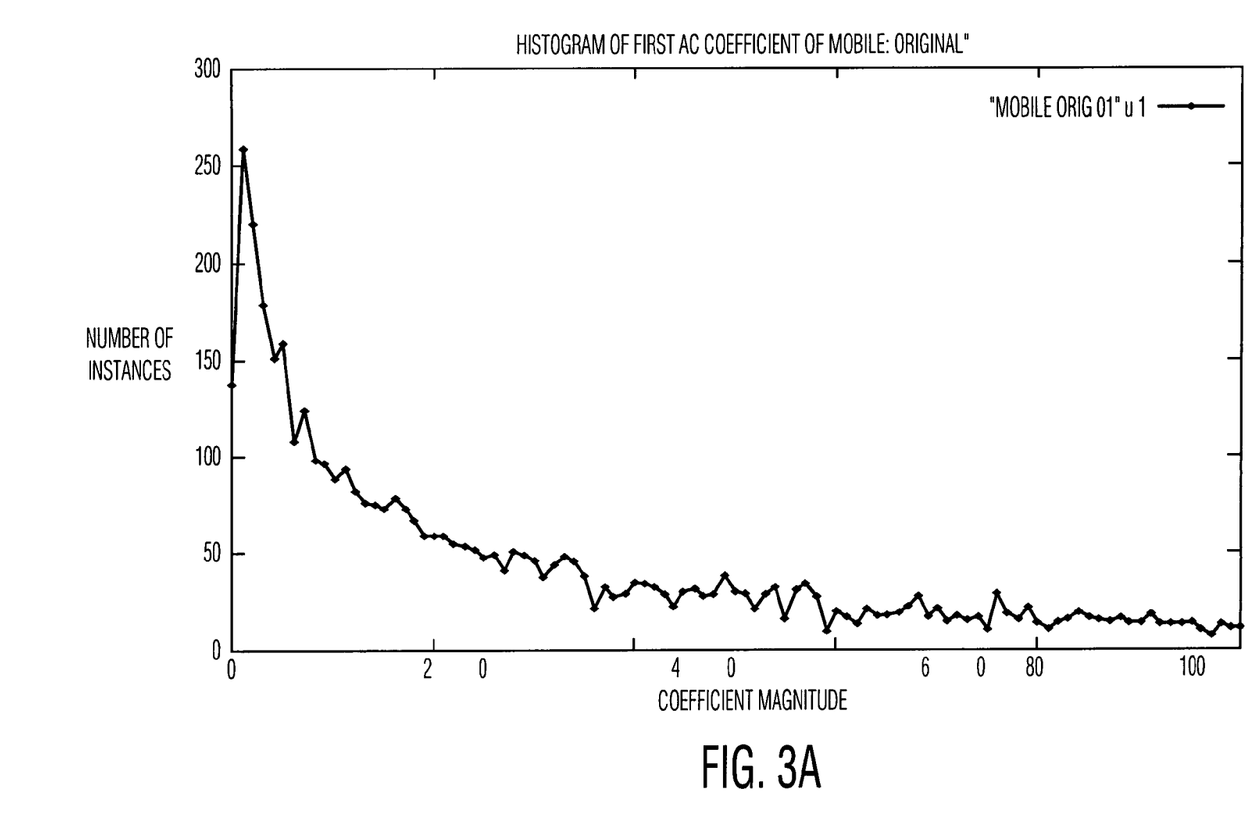
Figure 3B:
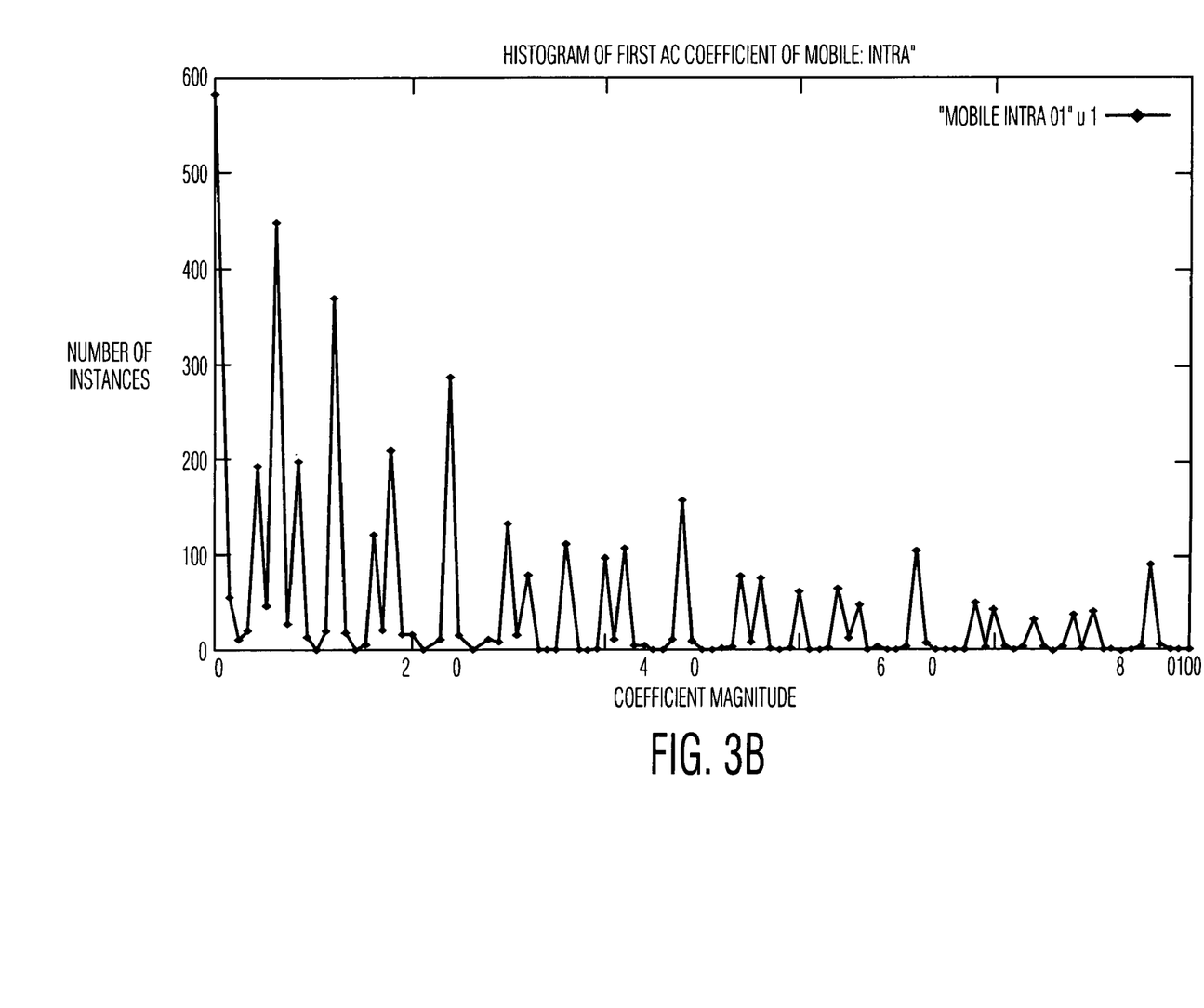
Figure 3C:
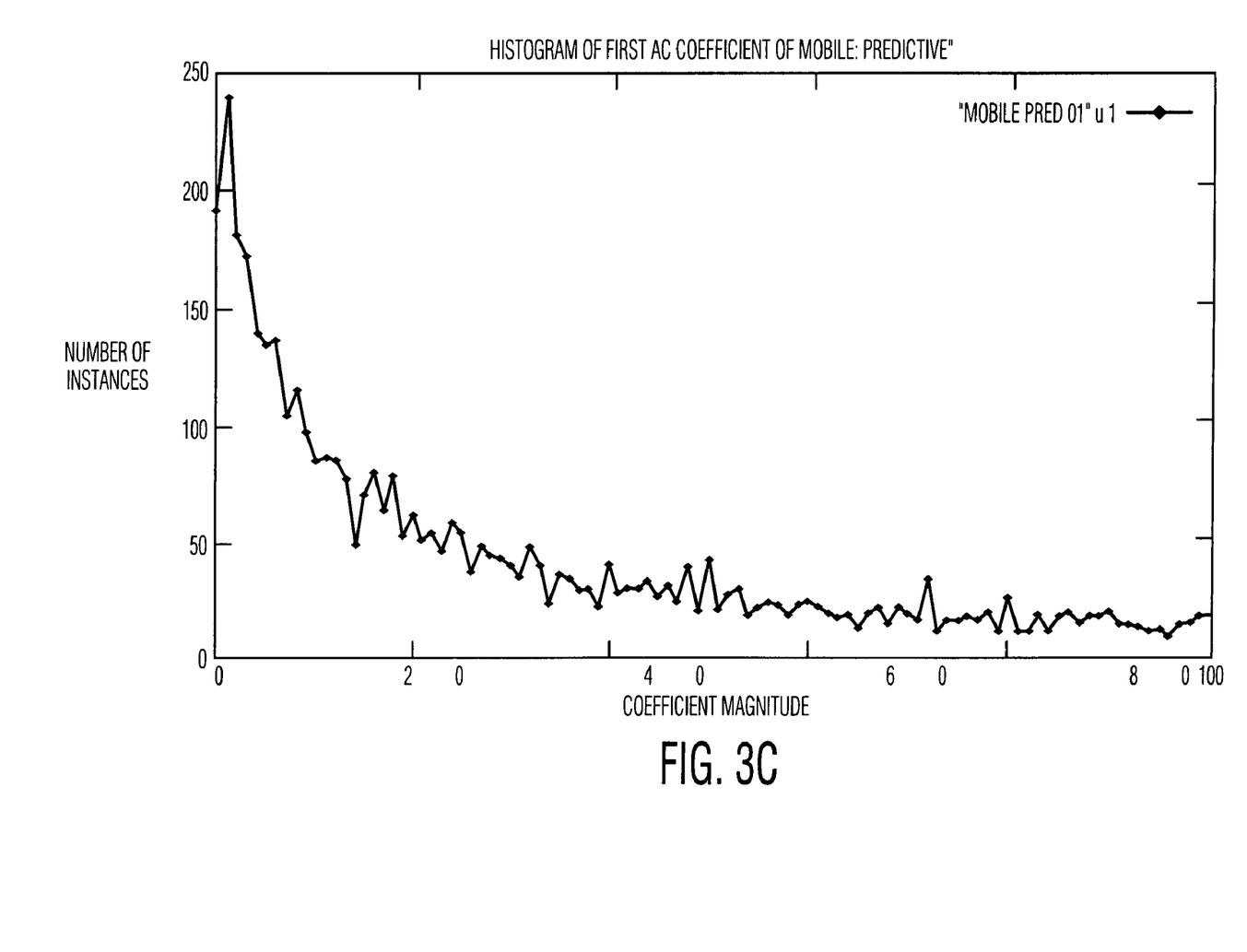

FIG. 3(a) shows a histogram of DCT coefficients for the AC frequency band of an image that has not been coded, whereas FIGS. 3(b) and 3(c) illustrates a histogram of that same AC frequency band, in which video data has previously been coded. As shown in FIGS. 3(a) through 3(c), the AC DCT coefficients are highly structured compared with those of P/B pictures or non-compressed pictures. The histogram for the previously-coded video data shows a series of spikes, which correspond to reconstruction levels for DCT coefficients of the AC frequency band. Thus, the spacing between these spikes contains information relating to the quantization weight that was previously used to code that AC frequency band. In the embodiment, the detection of intra-coded pictures is, therefore, performed on this statistical difference.

Now, a description will be made in detail regarding this invention taking an MPEG bitstream as an example.

Figure 4:
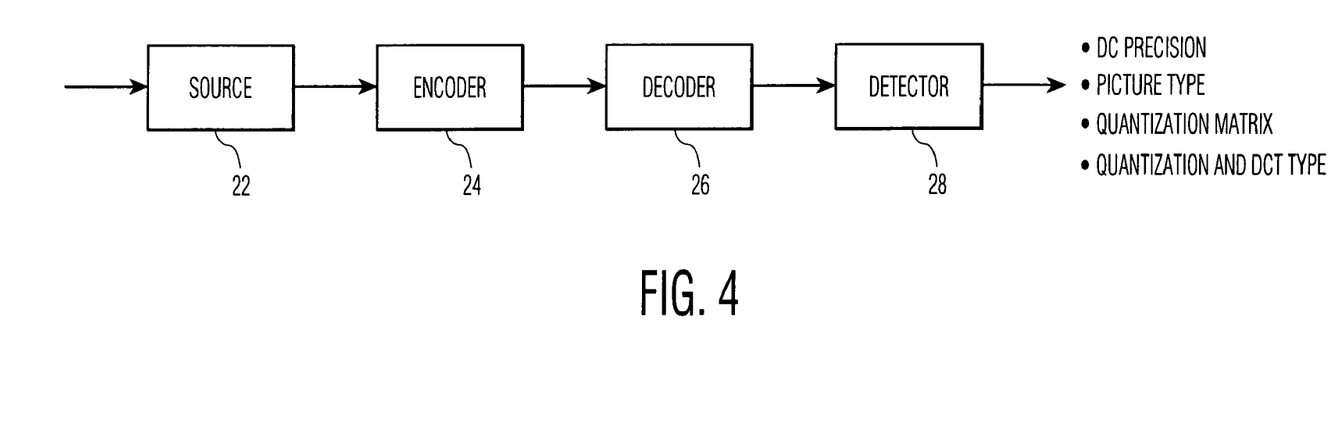
FIG. 4 is a simplified block diagram illustrating a coding system whereto the embodiment of the present invention is applied.

FIG. 4 is a simplified block diagram illustrating the architecture of an MPEG communication system whereto embodiments of the present invention are to be applied. The inventive system includes a video source 22, an encoder 24, a decoder 26, and a detector 28. The source 22 may be any type of video generating device, such as a television camera or other video equipment that is capable of generating video data based on a particular image. The encoder 24 and decoder 26 may be any conventional encoder and decoder known in this art for encoding/decoding MPEG2 video data, respectively. The detector 28 processes the decoded video data to extract various compression parameters, such as the picture type, DC precision, quantization matrix at the frame level, and quantizer scale/step value and DCT type at the macroblock level, that may be used for enhancing, re-coding, and/or transcoding the previously compressed video data. For example, the number of coded bits can be reduced by adjusting the DC coefficient precision variable, and the quantizer step size may be used to modify the step size within a block, etc.

Figure 5:
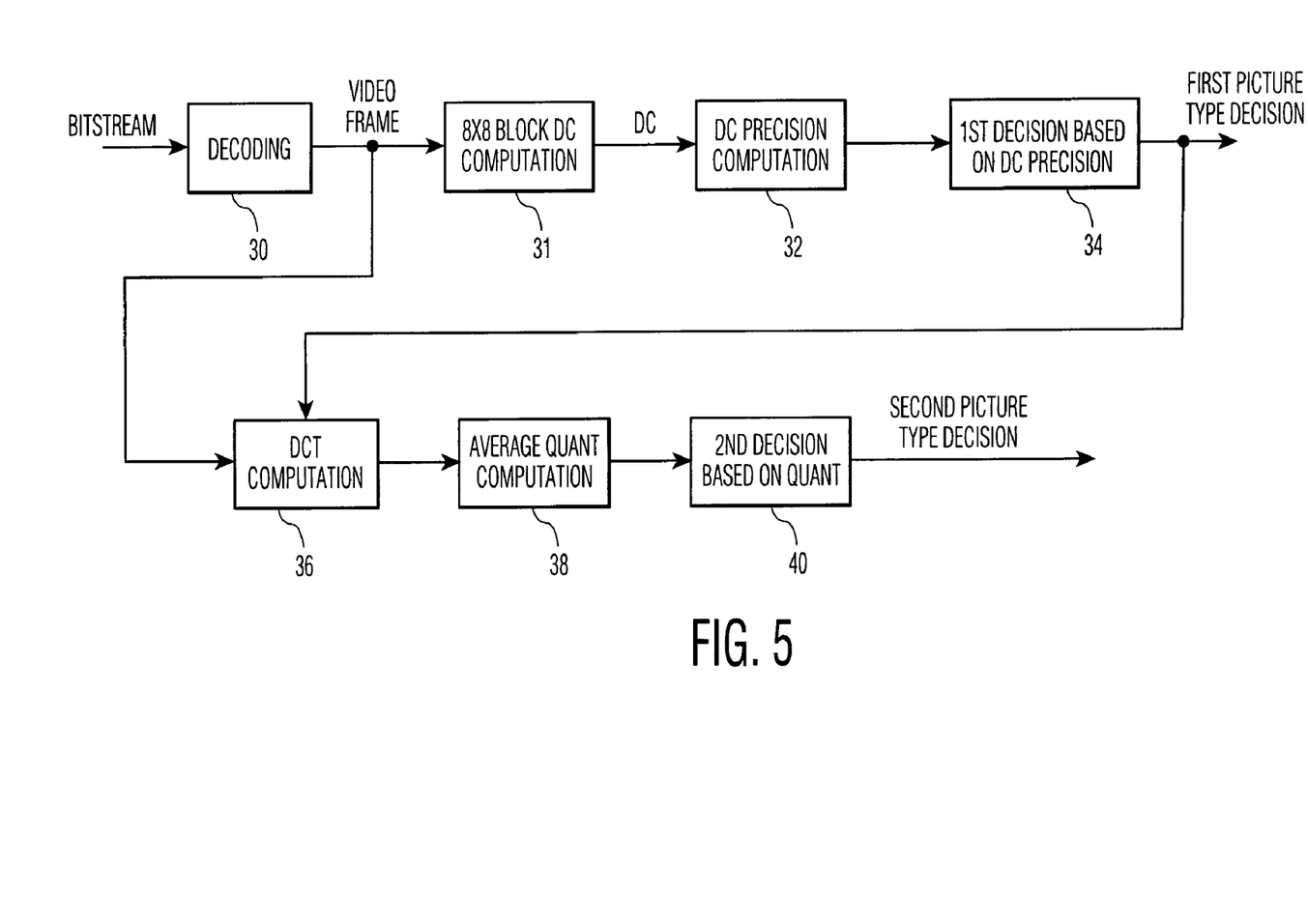
FIG. 5 is a simplified block diagram illustrating a detecting system according to an embodiment of the present invention.

FIG. 5 depicts a detailed description of the detector 28 according to an exemplary embodiment of the present invention. As shown in FIG. 5, the detector 28 includes an 8×8 DC computation 31 block, a DC precision computation block 32, a first decision block 34, a DCT computation block 36, an average quantization computation block 38, and a second decision block 40. The encoder 24 and decoder 26 may be any conventional encoder and decoder known in this art for encoding/decoding MPEG2 video data, respectively.

Figure 6:
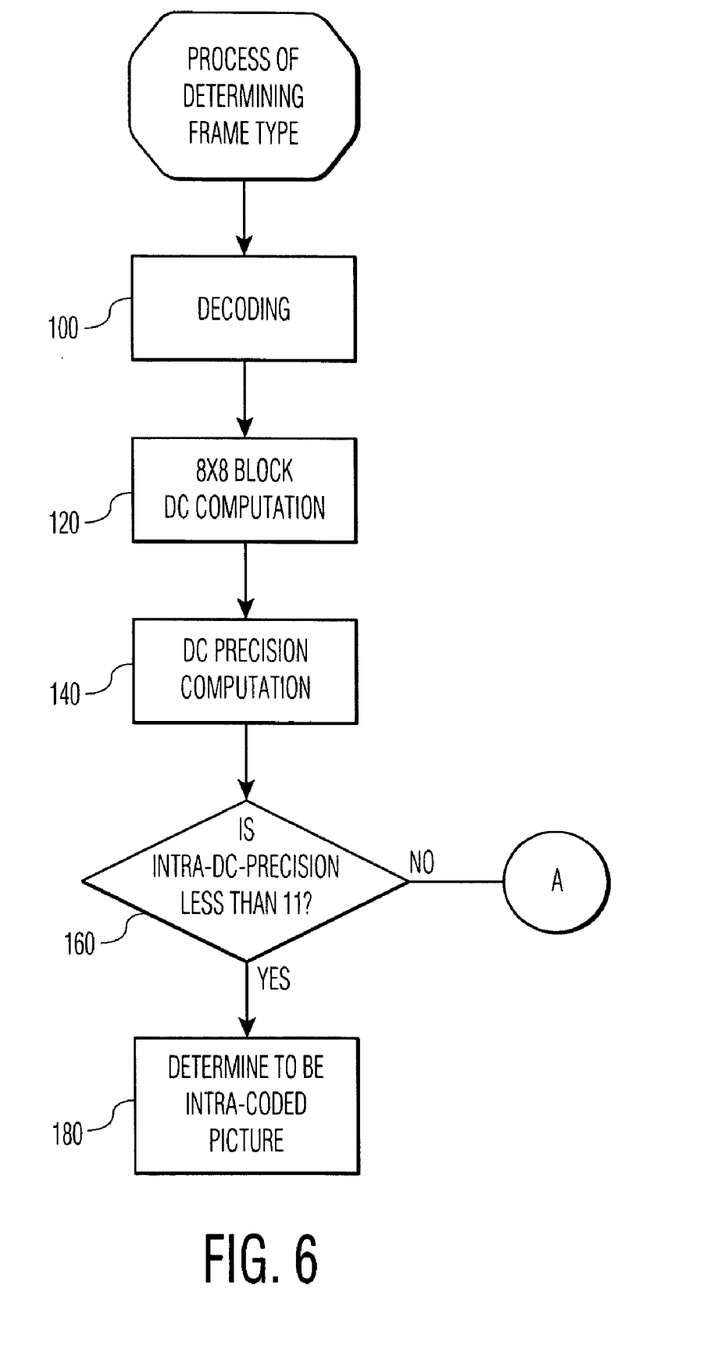
FIG. 6 is a flow chart illustrating the operation steps of detecting a picture type from uncoded video data according to an embodiment of the present invention.
Figure 7:
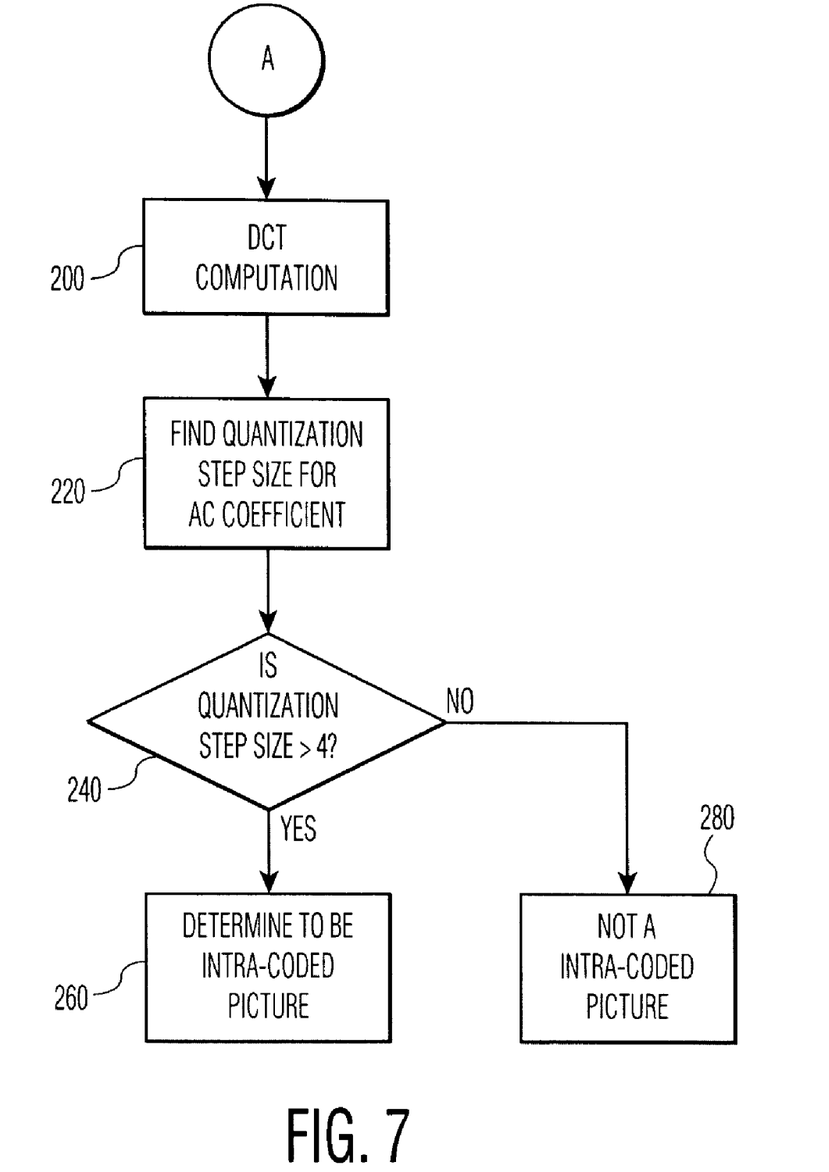
FIG. 7 is a flow chart illustrating the operation steps of detecting a picture type from uncoded video data according to an embodiment of the present invention; and, FIG. 8 is a simplified block diagram illustrating a detecting system of extracting compression parameters according to another embodiment of the present invention.

FIGS. 6 and 7 are flow charts showing the operation steps of the detector 28 that is shown in FIG. 5. Referring to FIG. 6, the decoder 30 decodes the bitstream using any conventional decoder known in this art in step 100, whereafter the decoded video frame is forwarded to the 8×8 block DC computation 31. In step 120, the 8×8 block DC computation block 3 calculates DC DCT coefficient of the 8×8 block of the current image or sub-regions of the image using any conventional computation block known in this art. One simple method for calculating DC of a block is to take the average of the pixel values in the block. Then, the DC precision computation is performed via the DC precision computation block 32 to determine the value of intra-dc-precision in step 140. There are four possible values for intra-dc-precision, ranging from 8 to 11. The purpose of intra-dc-precision extraction is to find out what intra-dc-precision was used in the previous coding scheme. If intra-DC-precision p is used in the previous generation, then all DC coefficients should have zeroes for the last (11-p) bits.

However, due to the DCT-mismatch, some DC coefficients may not have this property. Therefore, a threshold is used in the present invention to test if most of the DC coefficients have zeroes as the last (11-p) bits and to determine P. This is shown in the following expressions:

```
for p = 8 to 10
    N = 0
    mask = 1<<(11-p) - 1
    for b = 0 to B-1
        if (DC_b & mask == 0)
            N ++
        endif
    end for
    if (N > threshold)
        intra_dc_precision = p
        return
    endif
end for
intra_dc_precision = 11,
``` where B represents the total number of blocks (including Y, U, and V) in the picture image or concerned sub-regions of the picture image, and $DC_b$ represents the DC coefficient for the bth block. The threshold is a fixed integer determined by the video resolution. A nominal value for threshold is 0.8*B. Thereafter, if the intra-DC-precision is determined to be less than 11 in step 160, the current picture is determined to be an intra-coded picture in step 180.

Referring to FIG. 7, if the intra-DC-precision is equal to 11 in step 160, the DCT computation of the current picture image or the sub regions of the current picture image is performed in step 200. That is, the uncoded video frame is subject to DCT processing in order to generate DCT coefficients for AC frequency bands in the video data. Then, the dominant quantizer step size for the first AC coefficient of the entire picture is extracted in step 220, as explained in U.S. Pat. No. 6,101,278, entitled "System for Extracting Coding Parameters from Video Data," assigned to the same assignee, thereby incorporated herein as a reference. If the dominant quantizer step size found is greater than 4 in step 240, then the current picture is determined to have been intra-coded in step 260. Otherwise, the current picture is determined as a not coded, or determined as P/B coded in step 280.

Figure 8:
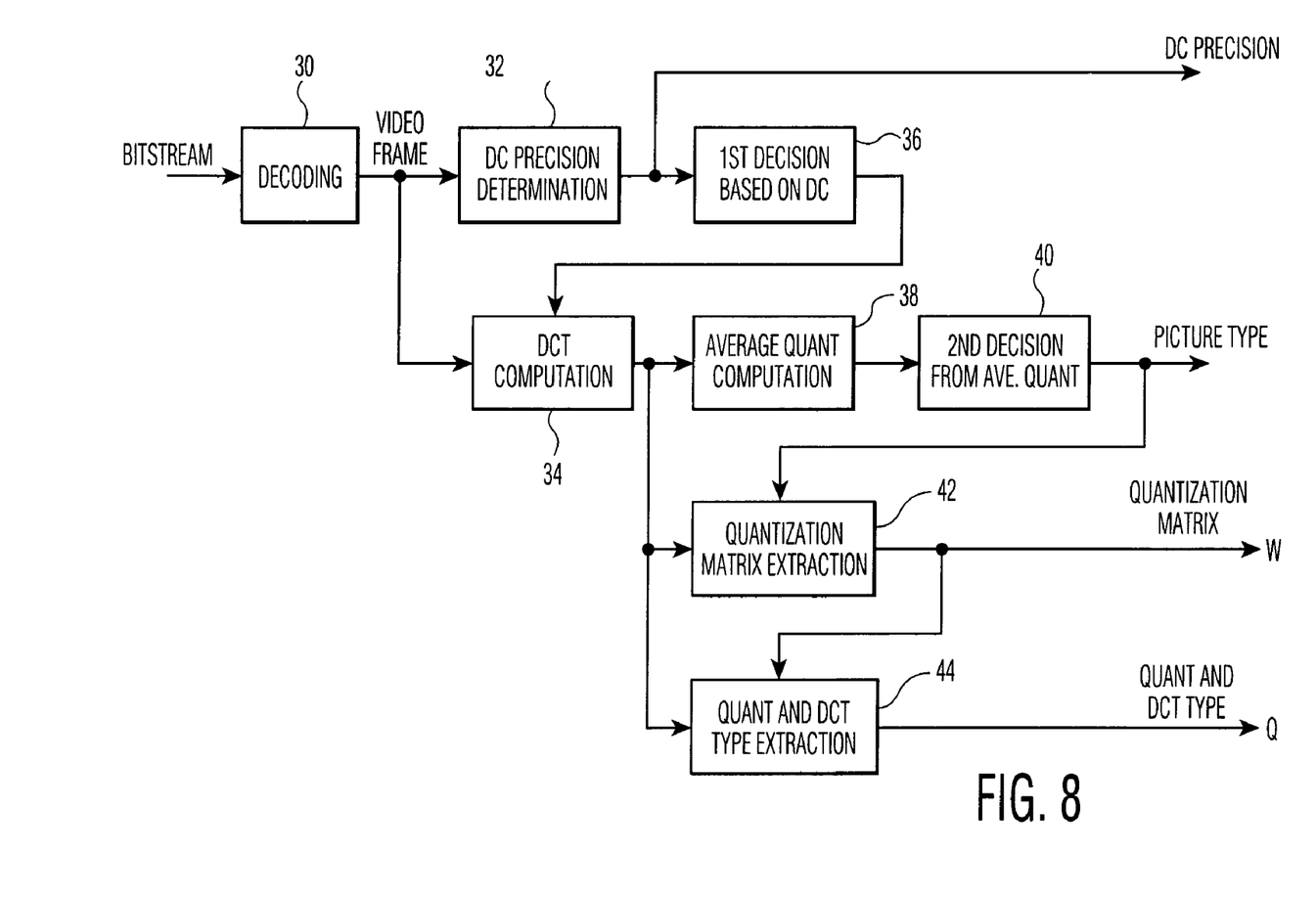

FIG. 8 depicts a detailed description of the detector 28 that is capable of extracting compression parameters from the decoded video data according to another embodiment of the present invention. As shown in FIG. 8, some of the construction and operation of the second embodiment are essentially the same as that described above with respect to FIG. 5, except that the second embodiment further includes a quantization matrix extraction block 42 for a frame level and a quantizer and a DCT type extraction block 44 for a macroblock level. Accordingly, the discussion of similar components made with reference to FIG. 5 is omitted to avoid redundancy. Thus, after determining that the current picture being analyzed is an intra-coded picture, the quantization matrix extraction block 42 further operates to extract the quantization matrix for each frame that corresponds to those used in a previous coding operation. Again, this process is explained in U.S. Pat. No. 6,101,278, entitled "System for Extracting Coding Parameters from Video Data," assigned to the same assignee, thereby incorporated herein as a reference. Thereafter, the quantizer and DCT extraction block 44 operates to extract the quantizer step size/scale for each macroblock. It should be noted that for the purpose of a DCT type extraction for an MPEG-2 compressed video, both frame-based and field-based DCT are performed on the macroblock, and that only a frame-based DCT may be performed for other frame-DCT based compression schemes such as MPEG-4 and H.26L. In the case of MPEG-2, a quantization matrix is first extracted as discussed in U.S. Pat. No. 6,101,278 to obtain the weights $W_{i,j}$, for i,j=0, 1 . . . 7 and i,j (0, 0). Each AC coefficient is then weighed according to the equation below:

$$\overline{C}_{i,j} = \frac{C_{i,j} \times 16}{W_{i,j}},$$

wherein $C_{i,j}$ represents the (i,j)th AC coefficient in the current macroblock, and $\overline{C}_{i,j}$ represents the weighted or normalized AC coefficient. In other DCT based compression schemes where a quantization matrix is not utilized, i.e., all AC coefficients in the same macroblock are quantized with the same step size, this step may be skipped. The operation of finding a DCT type and quantization scale according to the embodiment of the present invention is executed by finding the largest common divider for all normalized AC coefficients in the macroblock, or just for a selected set of coefficients, such as the first 4 AC coefficients in a zig-zag scanning order. For an MPEG-2 video, this is performed on both the frame DCT data and field DCT data. Here, the DCT type and quantization scale combination that yields the smaller quantization error is chosen.

It is noted that when the DCT data is not quantized, larger quantization scales lead to larger quantization distortion. However, if the DCT data has been quantized before, then the smaller quantization scale that is used in the previous quantization will yield a larger distortion. Hence, it is necessary to search and identify this abnormal increase in quantization distortion as quantization scale is increased, or the abnormal decrease in quantization distortion as quantization scale is decreased, in order to obtain the quantization scale that was used in the previous quantization. Finding the largest common divider for all normalized AC coefficients in the macroblock is processed as follows:

```
First for frame DCT block:
q=max_Q
d_max=large number
while (q>lowest_q_allowed)
{
    d=0
    for i,j = 0,...7 and i,j (0,0)
    {
        quantize C̃_i,j with q: _i,j = quantize(C̃_i,j, q)
        d = d + abs(C̃_i,j - _i,j)
        if(abs(d_prev/d) > threshold) return current_DCT_Type and q
        q=next_lower_q
        d_prev=d
    }
}
```

In the above pseudo-code, abs( ) stands for "absolute value" operation. The term, quantize( ) refers to the quantization procedure, which is specified by the video coding scheme. A nominal value for threshold is 1.5. The next_lower_q is determined according to different coding schemes. The above code essentially performs a search operation through possible quantization scale values and DCT types. When the search starts, the DCT type is initiated to frame DCT as the frame-based DCT is more likely used in MPEG-2 coded video. For other video coding standards, such as MPEG-1, MPEG-4 and H.263, or MPEG-2 field pictures, the DCT type will remain as frame based. The quantization scale is initiated to the highest value allowed by the standard. For example, in MPEG-2, this number is 62 or 112 depending on the coding scheme used for quantization scale. For each quantization scale value, the quantization distortion is computed for the current macroblock. The computed distortion is then compared with the previous computed and stored distortion. If the reduction in distortion in terms of ratio between the two exceeds a certain threshold (set to 1.5 above), then the current quantization scale is extracted and returned. If not, the current distortion is stored, and the search resumes with the next higher quantization scale as dictated by the standard or coding scheme. If a quantization scale is not extracted from frame DCT data, then the same search options are performed on the field DCT data. Alternatively, the search can start with the lowest possible quantization scale and proceeds up, or start with more likely quantization scales. For example, 10 for DVD video or DVB video, and higher than 10 for lower bit rate video.

Accordingly, the largest common divider for all normalized AC coefficients calculated, as described in the preceding paragraphs, to determine the DCT type and the quantization scale per macroblock.

Having thus described a preferred embodiment of a system and method for directly detecting compression and extracting compression information from uncompressed video data, it should be apparent to those skilled in the art that certain advantages of the system have been achieved. The present invention solves the problem of interoperability as compression information is recovered within a video processing function, not across, and without access to the bitstreams. This is extremely useful in scenarios where the video bitstreams are not passed along or stored after decoding, i.e., an STB plus TV setup. Moreover, it easily differentiates the present invention from those in competition. If both the present invention and the competition's products use decoders with standard interfaces, the present invention used for display, enhancement, re-coding, or quality measurement will provide better quality or more accurate measurement of quality. As a result, semiconductor manufacturers can build better IP blocks for video processing without having to conform to a certain system design (for bitstream access) or use a particularly modified decoder; display component manufacturers can build simple modules for display-integrated video processing or quality measurement with access to the uncompressed video alone.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for extracting coding parameters from encoded video data, the method comprising the steps of:

decoding at least a substantial portion of said encoded video data in an MPEG decoder and outputting a decompressed video data;

performing a DC computation operation to determine an intra-dc-precision level from said decompressed video data; and, if said intra-de-precision level is less than a first predetermined threshold, determining that said decompressed video data being processed corresponds to an intra-coded picture.

2. The method of claim 1, further comprising the steps of:

if said intra-de-precision level is equal to said first predetermined threshold, performing a discrete cosine transform (DCT) to produce at least one AC frequency band in said decompressed video data;

calculating a dominant average quantizer step size for the at least one AC frequency band; and, if said average quantizer step size is greater than a second predetermined threshold, determining that said decompressed video data being processed corresponds to an intra-coded picture.

3. The method of claim 1, further comprising the steps of:

extracting quantization matrix data of a frame of said decompressed video data; and, extracting a quantizer scale and a DCT type value for each block of said decompressed video data.

4. The method of claim 3, wherein said quantizer scale is calculated by avenging the AC coefficients in each of said decompressed video data as follows:

$$\overline{C}_{i,j} = \frac{C_{i,j} \times 16}{W_{i,j}},$$

where $C_{i,j}$ represents the $(i,j)$th AC coefficient in current block, $\overline{C}_{i,j}$ represents the normalized AC coefficient, and $W_{i,j}$ represents the $(i,j)$th quantization matrix.

5. The method of claim 2, further comprising the steps of:

extracting quantization matrix data of a frame of said decompressed video data; and, extracting a quantizer scale and a DCT type value for each block of said decompressed video data.

6. The method of claim 5, wherein said quantizes scale is calculated by averaging the AC coefficients in each of said decompressed video data as follows:

$$\overline{C}_{i,j} = \frac{C_{i,j} \times 16}{W_{i,j}},$$

where $C_{i,j}$ represents the $(i,j)$th AC coefficient in current block, $\overline{C}_{i,j}$ represents the normalized AC coefficient, and $W_{i,j}$ represents the $(i,j)$th quantization matrix.

7. The method of claim 1, wherein each of said decompressed video data is divided into blocks.

8. The method of claim 3, wherein said quantization matrix, said quantizer scale, and said DCT type value correspond substantially to coding parameters used in a coding operation that was previously performed on said encoded video data.

9. A method for extracting coding parameters from an encoded digital video signal, the method comprising the steps of:

receiving encoded data of said encoded digital video signal at an MPEG decoder and producing therefrom decoded data comprised of a plurality of blocks;

performing a DC computation operation to determine an intra-de-precision level from said decoded video data;

if said intra-de-precision level is less than a first predefined threshold, classifying said decoded video data as an intra-coded picture;

if said intra-de-precision Level is equal to said first predefined threshold, performing a discrete cosine transform (DCT) on said decoded video data to produce a set of DCT coefficients for at least one AC frequency band;

calculating a quantizer step size for the at least one AC frequency band; and, classifying said decoded video data as an intra-coded picture if said calculated quantizer step size is greater than a second predefined threshold.

10. The method of claim 9, further comprising the steps of:

extracting quantization matrix data of a frame of said decoded video data; and, extracting a quantizer scale and a DCT type value for each block of said decoded video data.

11. The method of claim 10, wherein said quantizer scale is calculated by averaging the AC coefficients in each of said decompressed video data as follows:

$$\overline{C}_{i,j} = \frac{C_{i,j} \times 16}{W_{i,j}},$$

where $C_{i,j}$ represents the $(i,j)$th AC coefficient in current block, $\overline{C}_{i,j}$ represents the normalized AC coefficient, and $W_{i,j}$ represents the $(i,j)$th quantization matrix.

12. The method of claim 10, wherein said quantization matrix, said quantizer scale, and said DCT type value correspond substantially to coding parameters used in a coding operation that was previously performed on said encoded video data.

13. A system for extracting coding parameters from encoded video data comprising:

a decoder for decoding at least a substantial portion of said encoded video data to produce decoded video data comprised of a plurality of blocks;

a computation circuit for performing a DC computation operation to determine an intra-dc-precision level from said decoded video data; and, a decision circuit for determining whether said decoded video data being processed corresponds to an intra-coded picture.

14. The system of claim 13, further comprising:

a discrete cosine transform (DCT) circuit for generating a set of DCT coefficients for at least one AC frequency band in said decoded video data; and, a quantization computation circuit for determining a quantizer step size for the at least one AC frequency band.

15. The system of claim 13, wherein said decoded video data is classified as an intra-coded picture if said intra-dc-precision level is less than, a first predetermined threshold.

16. The system of claim 13, wherein said decoded video data is classified as an intra-coded picture if said quantizer step size is greater than a second predetermined threshold.

17. The system of claim 13, further comprising:
a first extractor for extracting quantization matrix data of a frame of said decoded video data; and,
a second extractor for extracting a quantizer scale and a DCT type value for each block of said decoded video data.

18. The system of claim 14, further comprising:
a first extractor for extracting quantization matrix data of a frame of said decoded video data; and,
a second extractor for extracting a quantizer scale and a DCT type value for each block of said decoded video data.

19. The system of claim 17, wherein said quantization matrix, said quantizer scale, and said DCT type value correspond substantially to coding parameters used in a coding operation that was previously performed on said encoded video data.

20. A system for extracting coding parameters from an encoded digital video signal, the method comprising the steps of:
a memory for staring a computer-readable code; and,
a processor operatively coupled to said memory, said processor configured to:
receive encoded data of said encoded digital video signal to produce decoded data;
perform a DC computation operation to determine an intra-dc-precision level from said decoded video data;
classify said decoded video data as an intra-caded picture if said intra-dc-precision level is less than a first predefined threshold
perform a discrete cosine transform (DCT) on said decoded video data to produce a set of DCT coefficients for at least one AC frequency band if said intra-dc-precision level is equal to said first predefined threshold,
calculate a quantizer step size for the at least one AC frequency band; and,
classify said decoded video data as an intra-coded picture if said quantizer step size is greater than a second predefined threshold.

21. The system of claim 20, wherein said processor is configured further to:
extract quantization matrix data of a frame of said decoded video data; and,
extract a quantizer size step and a DCT type value for each block of said decoded video data.

22. The system of claim 20, wherein said quantization matrix, said quantizer scale, and said DCT type value correspond substantially to coding parameters used in a coding operation that was previously performed on said encoded video data.

* * * * *